United States Patent [19]

Spils

[11] Patent Number: 4,494,731
[45] Date of Patent: Jan. 22, 1985

[54] VALVE HAVING A MOVABLE INTERFACE ISOLATING AN ACTUATING MECHANISM

[76] Inventor: Richard W. Spils, 2225 Spenard Rd., Anchorage, Ak. 99503

[21] Appl. No.: 377,964

[22] Filed: May 13, 1982

Related U.S. Application Data

[63] Continuation-in-part of Ser. No. 165,694, Jul. 3, 1980, Pat. No. 4,363,464.

[51] Int. Cl.³ .................. F16K 31/50; F16K 47/04
[52] U.S. Cl. .................................. 251/355; 251/121; 251/127; 251/266
[58] Field of Search ............... 251/355, 121, 127, 266; 137/625.3, 614.11

[56] References Cited

U.S. PATENT DOCUMENTS

| | | | |
|---|---|---|---|
| 2,224,447 | 12/1940 | Penick et al. | 251/355 X |
| 2,568,935 | 9/1951 | Smith | 137/246.12 X |
| 2,593,968 | 4/1952 | Bowan et al. | 137/246.12 X |
| 3,013,769 | 12/1961 | Volpin | 251/355 X |
| 3,620,502 | 11/1971 | Lawson | 251/355 |

Primary Examiner—Arnold Rosenthal
Attorney, Agent, or Firm—Klarquist, Sparkman, Campbell, Leigh & Whinston

[57] ABSTRACT

A valve constructed such that the part of the valve member actuating mechanism, which is located within the valve, is sealingly isolated from the flow passageway by an arrangement including a chamber whose volume changes upon movement of the valve member. A movable interface is provided between the chamber and the flow passageway, and is moved upon increases or decreases in the volume of the chamber, in the appropriate direction, to compensate for such volume changes. The valve may have a device for injecting a lubricant into the chamber and for contact with the interface.

6 Claims, 9 Drawing Figures

VALVE HAVING A MOVABLE INTERFACE ISOLATING AN ACTUATING MECHANISM

The present application is a continution-in-part of, and is copending with, my prior application entitled "Angle Globe Valve", filed July 3, 1980, Ser. No. 165,694 now U.S. Pat. No. 4,363,464, dated Dec. 14, 1982. The latter application shows a multiple stage high pressure valve for handling fluids. Benefit of its filing date, as to common subject matter, is claimed. The valve of such application has a valve actuating mechanism, exposed interiorly. The arrangement is such that part of the movable valve member is sealingly interposed between such mechanism and the fluid passageway of the valve by projecting into an interior chamber. This chamber changes in size due to movement of the movable valve member. To accommodate this and to isolate the mechanism from the fluids being handled, I provide a movable interface in the form of a slidable plug.

The present invention relates to a valve construction and particularly one in which it is desired to isolate the mechanism for actuating the movable valve member from the fluid being handled.

A main object of the present invention is to provide a valve in which there are movable interface means for isolating the mechanism, which actuates the valve, from the fluids being handled. It is a more specific object of the invention to provide such an arrangement wherein there are means for filling the chamber with a lubricant, such as grease.

A further object is to provide such an arrangement in which air can be exhausted from the grease chamber and wherein, under a suitable pressure, grease can actually be expelled through the interface plug.

Various other objects will be apparent when taken in connection with the accompanying drawings, wherein like elements are identified by like reference numerals.

FIG. 1a is a fragmentary view of a portion of FIG. 1;

FIG. 1b is a cross section through the plug;

Figure 1:
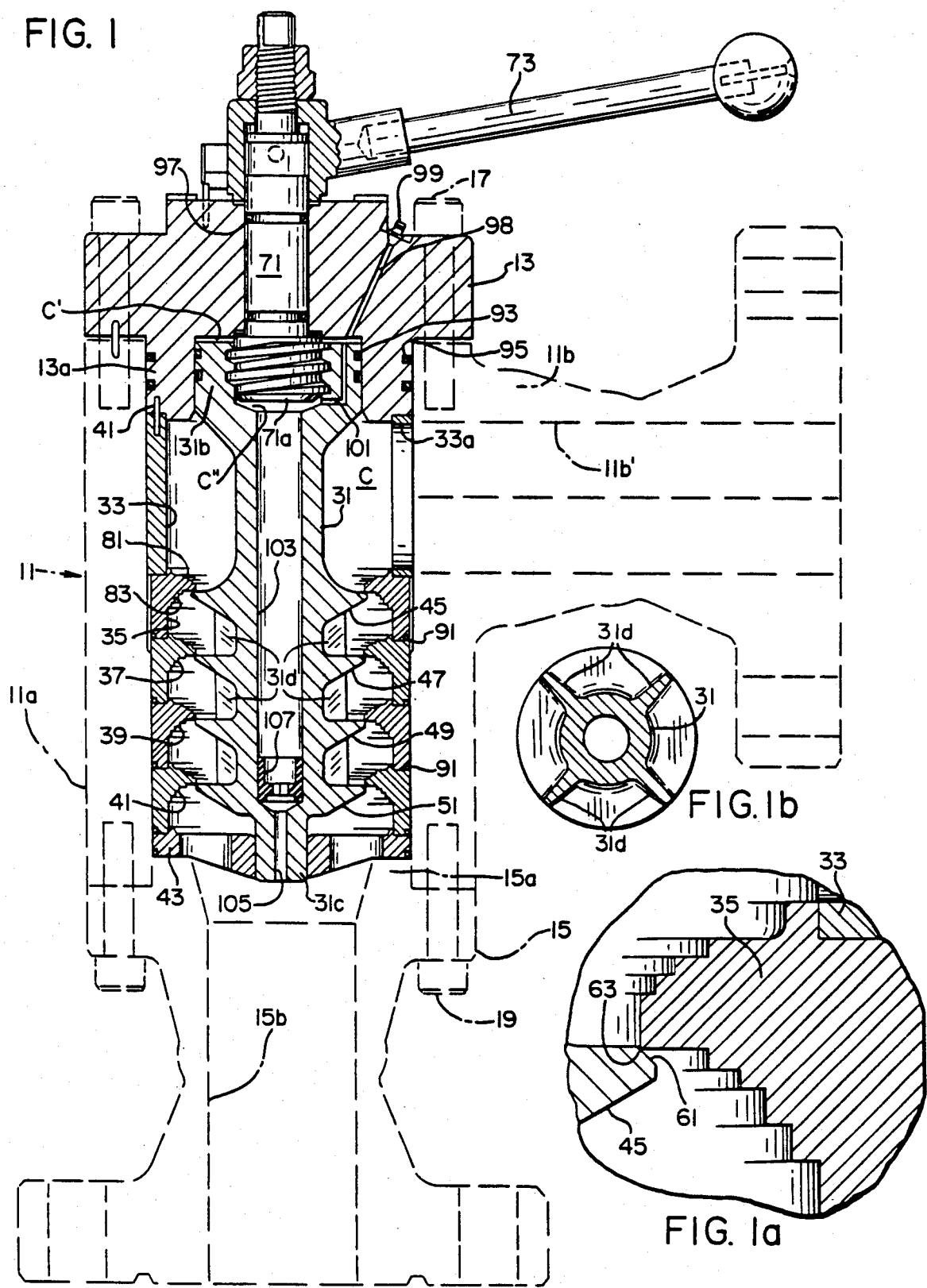
FIG. 1 is a vertical midsection through an angle globe value of my invention, showing the valve closed.

The FIG. 1 angle valve has a body 11 disposed between a bonnet flange 13 and an outlet flange 15, the flanges being secured to the body by bolts 17 and 19, respectively. The body and the outlet flange are of conventional form, and thus are shown in broken lines. The bonnet is of a slightly modified form, while the interior parts are new, so that these are shown in solid lines. The bonnet flange and interior parts may be considered as a kit for converting an existing valve to one of my design. Of course, an original valve of my design may be produced utilizing both the broken and solid lined parts of FIG. 1.

The body 11 commonly has an upright cylindrical portion 11a from which an integral inlet flange portion 11b projects at right angles. Within the cylindrical portion 11a is a stack of rings, encircling a valve member in the form of a plug 31, which is designed to move vertically, as the parts are shown in FIG. 1. The ring stack includes a spacer tube 33, four stage rings 35, 37, 39 and 41, and a spider guide ring 43.

This ring stack is clampled between a boss 15a on outlet flange 15, and a boss 13a on the bonnet flange 13. The combined height of the ring stack and the bosses is slightly greater than that of the cylindrical portion 11a to facilitate the clamping relationship. In order to properly orient an inlet portion 33a of the spacer tube 33 with the inlet passage 11b of the inlet flange portion 11b, an alignment pin 41 is provided. It fits in appropriate bores formed in opposing faces of the boss 13a and the tube 33.

The plug 31 is formed with a series of annular flanges or flaring steps 45, 47, 49 and 51, spaced like the rings 35–41, and cooperatively related to said rings. The upper step has a hardened beveled edge 61 (FIG. 1a) seating against an edge 63 of the ring 35, while the diameters of the other steps are just slightly less than the interior diameters of the associated stage rings so as not to interfere with good seating contact at 61–63. The plug 31 may be moved vertically from its closed position in FIG. 1 to its fully opened position in FIG. 2 or at any position therebetween. In its fully opened position, a labyrinth path P (FIG. 2) is provided by which high pressure fluid in the cavity or chamber C, defined by the spacer tube 33, is decreased in stages from that in the cavity, to a lower pressure in the outlet passage 15b of the outlet flange 15.

If the vertical axial movement of the plug 31 is achieved by an axially moving stem, greater sealing problems are presented than with a turning stem. I achieve the advantages of a turning stem, with axial plug movement, by providing a motion converting mechanism within the valve body.

Figure 2:
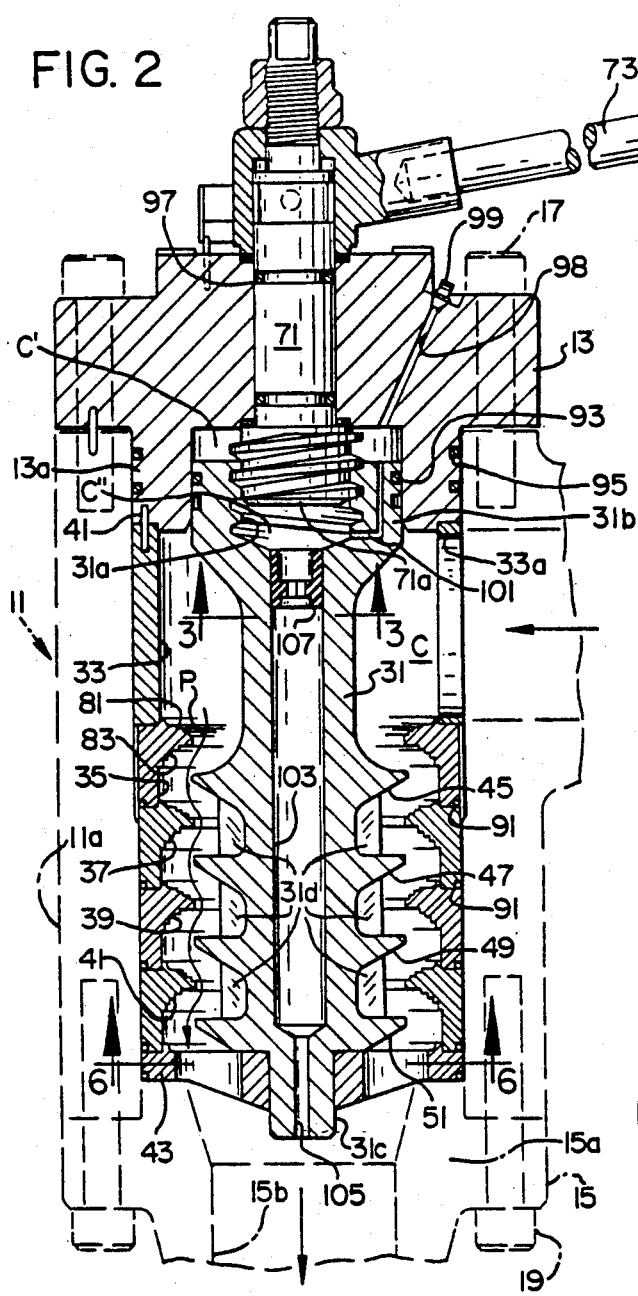
FIG. 2 is a view like FIG. 1 but with the valve fully open.

Referring to FIG. 2, the valve has a turnable valve stem 71 projecting through a bore in the bonnet flange 13. The stem is turned by a handle 73 fixed to the stem, or optionally the stem may be turned by any other device, powered or otherwise.

Figure 6:
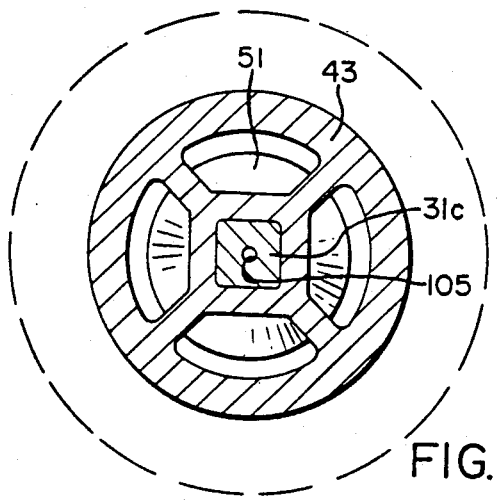
FIG. 6 is a cross section taken along lines 6—6 of FIG. 2.
Figure 4:
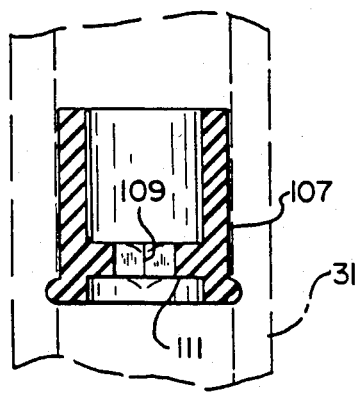
FIG. 4 is an enlarged fragmentary view of the lubricant sealing plug.
Figure 5:
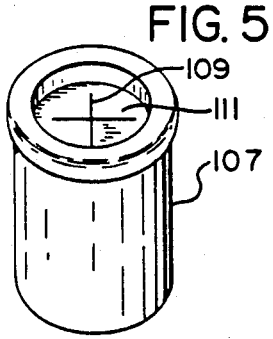
FIG. 5 is a perspective view of the plug.

The motion converting mechanism includes the lower end of the stem which is lead-screw threaded at 71a (FIG. 2) to threadedly engage female threads 31a formed in an enlarged upper end 31b of the plug 31. The lower end of the plug has a non-circular stub 31c (FIGS. 2 and 6) slidably but non-rotatably received in a central bore provided by the spider guide ring 43.

The guide ring is held against turning movement by being clamped against boss 15a. Hence, as handle 73 is turned, causing relative movement between the threaded stem portion 71 and the threads on the plug 31, the plug is moved downwardly an extent depending on the amount the handle is turned. Preferably, the threads 71a are so designed that slightly less than 360 degrees movement of the handle will shift the plug from its fully closed to its fully opened position.

Each stage ring may be considered as comprising a ring portion and an upwardly extending annular flange, each of which has an upstream face, a downstream face and an intermediate face. Each upstream face is formed with plural upper stepped portions or ridges 81 and each downstream face is formed with plural stepped portions or lower ridges 83. These ridges create turbulent flow and thus good frictional contact between the flowing fluid and the stage rings. This effects a transformation of the kinetic energy of the fluid into heat energy, which is carried away by the fluid passing through the valve.

Note that the two stage ring ridges closest the controlling edge of the respective plug step participate in the control of the fluid flow, to accomplish double orificing at each stage of the valve.

When the plug 31 is moved to its closed position, a fluid seal is provided at the seat 61. I provide a series of O-ring seals 91 ato prevent fluids from bypassing the seat 61, by traveling downwardly between the exterior surfaces of the stage rings and the interior surface of the body 11, and entering the flow passage at any of the meeting faces of the stage rings, with one another or with the guide ring, or entering between the meeting faces of the guide ring and the boss 15a. I provide other O-ring seals 93 between the large, what might be termed piston, portion of the plug 31 and the opposed surfaces of the boss 13a. Still other O-ring seals are provided at 95 and 97 to prevent leakage.

I provide means for lubricating the threaded connection at 71a–31a. This includes a drilled hole 98 (FIG. 2) through the bonnet flange 13. A grease fitting 99 is provided at the upper end of the hole to enable grease to be pumped through the hole and into a first lubricant cavity C' above the plug. A hole 101 is provided in the upper end of the plug in bypassing relation to the threaded stem portion 71a so that grease can be supplied to a second lubricant cavity C" in the plug and have access to the threads 31a. Preferably the hole 101 is formed in the lower end of the stem rather than in the plug, because it can be more readily formed in the stem.

When the plug is moved downwardly, the cavities C' and C" enlarge. To accommodate this change in volume, I provide a third lubricant cavity in the form of a central bore 103 within the plug, communicating at one end with the cavity C", and at its other end with the outlet passage 15b via a small bore 105. A rubber plug 107 is slidably received by the bore 103 to separate the grease in the cavities C' C" from the fluid being controlled by the valve.

Figure 3:
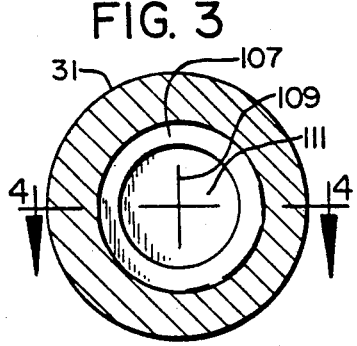
FIG. 3 is a cross section taken along line 3—3 of FIG. 2.

With the plug 31 in its closed position, grease is pumped into the chambers or cavities C' and C" forcing the plug 107 downwardly until it seats at the lower end of the bore 103. The plug has a cross slit 109 (FIG. 3) in a central flange 111. When the plug reaches the lower end of its travel and further grease is injected to make sure that the plug is fully down, the excess can force its way through the slit and into the bore 105.

Now, as the plug is lowered and the cavities C' and C" enlarge, the plug 107 will be forced upwardly by the fluid pressure beneath it, to keep the first and second lubricant cavities filled with grease. It is evident therefore that the third lubricant cavity provided by the passageway 103 is decreased in size proportional to the increase in size of the first and second lubricant cavities. When the plug 31 is closed, the grease in the first and second lubricant cavities is expelled therefrom into the third lubricant cavity forcing the plug 107 downwardly to the FIG. 1 position.

The bores 103 and 105 and the cavity C" provide a balanced pressure plug in that the pressure in the outlet passage 15b is transmitted by the bores and cavities to the upper face of the plug. The diameter of the piston portion 31b of plug 31 is made smaller than the inside diameter of the rings 45–51, to achieve a net axial downward force on the plug to make for stable plug positioning.

Preferably I provide plural flanges 31d (FIG. 1b) on the plug 31 which function as vertical flow dividers between the plug steps. They prevent vortexing flow, serve as alignment guides in assembly, and stiffen the plug.

Figure 7:
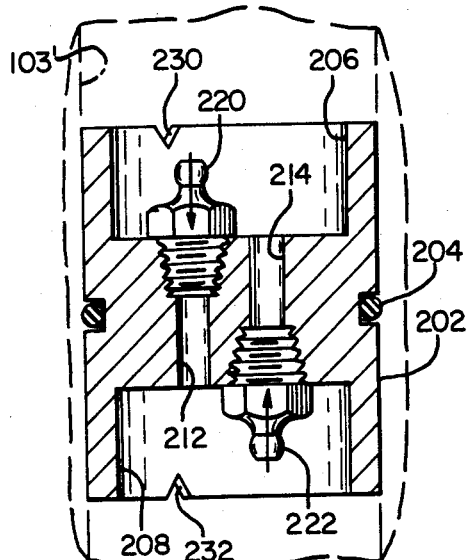
FIG. 7 shows a preferred form of movable interfacing plug.

FIG. 7 shows a preferred form of movable interfacing plug 200, as a substitute for plug 107. The plug in FIG. 7 comprises a metal body 202, grooved to receive an O-ring seal 204, sealingly engaging the side walls of a bore 103' in a valve plug 31'. Interface plug 200 is formed with oppositely directed recesses 206 and 208 to leave a separating wall 210 between the recesses. Formed through the wall are a pair of passages 212 and 214. The upper end, as the parts are shown in FIG. 7, of passage 212, is threaded to receive a downwardly opening spring-loaded ball check valve 220, which may be a conventional Alemite fitting. The lower end of passage 214 is threaded to receive an upwardly opening spring-loaded ball check valve 222.

The upstanding side walls left by the recesses 206 and 108 are notched at 230 and 232 for the passage of fluid therethrough.

The FIG. 7 plug works as follows: assume that the valve is closed, grease will be injected into the bore to drive the interface plug downwardly, the spring resistance to opening of check valve 220 being sufficient to keep the check valve closed until a greater force is exerted against it. When the plug reaches the bottom, and the grease supply is continued, any air trapped in the bore will be driven out through the check valve. As a safety measure, the injection of grease is continued until a certain amount of it is injected through the fitting 220, which assures the user that the air has been exhausted, and that the bore 103' and the chambers or cavities associated with it are full of grease.

When the valve plug 31' is subsequently forced downwardly, to open the valve, the cavity C' above the plug increases in volume and as this occurs, the interface plug is moved upwardly, because of the differential pressure thereacross, to accommodate the volume change.

The fitting 222 is provided to enable fluid under certain circumstances to pass through the fitting and into the bore 103', but it will be retained in the lower portion of the bore and will not gain access to the upper portions thereof or to the chambers C' or C".

What is claimed is:

1. A valve comprising:
    a valve body having a body cavity,
    a valve member movable in said valve body cavity,
    means providing at least one lubricant cavity associated with said valve member and changing in size upon movement of said member,
    and means providing another lubricant cavity communicating with said one lubricant cavity and providing an interface between said body cavity and said other lubricant cavity movable concurrently with movement of said valve member to reduce the size of said other lubricant cavity in proportion to the increase in size in the first mentioned lubricant cavity.

2. A valve as described in claim 1, wherein:
    said valve member has a through passageway providing said other lubricant cavity,
    said movable interface comprising an element slidably disposed is said passageway.

3. A valve comprising a valve body having a flow passageway and a cavity leading from such passageway, a valve member movable to control the flow of fluid in the passageway, and having a portion projecting into the cavity in sealing relation with respect thereto and isolating a portion of said cavity to define a first lubricant cavity, actuating means for actuating said valve member and projecting into said valve member and with said valve member defining a second lubricant cavity communicating with said first lubricant cavity, said valve member being formed with a third lubricant cavity communicating with said second lubricant cavity, interface means in said third lubricant cavity providing a movable interface to vary the size of said third lubricant cavity inversely in accordance with increases or decreases in the sizes of said first and second lubricant cavities.

4. A valve as recited in claim 3, wherein there are means for injecting a lubricant into said cavity.

5. A valve as recited in claim 3 in which said interface means includes a plug in sliding engagement with the walls of said third lubricant cavity.

6. A valve as described in claim 5 wherein the plug has means permitting a breach of the interface under predetermined pressure.

* * * * *